US008914531B2

(12) United States Patent
Chiang

(10) Patent No.: US 8,914,531 B2
(45) Date of Patent: Dec. 16, 2014

(54) BROADBAND EXTENSION FOR CONTENT DELIVERY

(75) Inventor: Mung Chiang, Cherry Hill, NJ (US)

(73) Assignee: Empire Technology Development LLC, Wilmington, DE (US)

(*) Notice: Subject to any disclaimer, the term of this patent is extended or adjusted under 35 U.S.C. 154(b) by 499 days.

(21) Appl. No.: 12/416,156

(22) Filed: Apr. 1, 2009

(65) Prior Publication Data

US 2010/0257279 A1 Oct. 7, 2010

(51) Int. Cl.
*G06F 15/16* (2006.01)
*H04L 29/08* (2006.01)

(52) U.S. Cl.
CPC ............. *H04L 67/06* (2013.01); *H04L 67/04* (2013.01)
USPC ..................... 709/231; 709/230; 709/219

(58) Field of Classification Search
USPC ............................................. 709/230, 231
See application file for complete search history.

(56) References Cited

U.S. PATENT DOCUMENTS

| 2003/0036045 A1* | 2/2003 | Vivian ..................... 434/350 |
| 2006/0031126 A1* | 2/2006 | Ma et al. .................. 705/26 |
| 2006/0087993 A1* | 4/2006 | Sengupta et al. ............ 370/310 |
| 2008/0126420 A1* | 5/2008 | Wright et al. .............. 707/104.1 |
| 2008/0165701 A1* | 7/2008 | Ananthanarayanan et al. .................... 370/254 |
| 2008/0177860 A1* | 7/2008 | Khedouri et al. ............ 709/217 |
| 2008/0243924 A1* | 10/2008 | Barrett et al. .............. 707/104.1 |

* cited by examiner

*Primary Examiner* — Umar Cheema
(74) *Attorney, Agent, or Firm* — Ren-Sheng International

(57) ABSTRACT

Methods are generally described for distributing and storing contents over a wireless network in a home or another similar environment. A storage device may be configured to automatically download content using broadband communications. A wireless device may establish communication with the storage device when within range for wireless communications. The established communications with the storage device may be a direct wireless communication link or an indirect communication link through other networking devices. The wireless device may download contents from the storage device during an idle time when the wireless device has sufficient power available. Downloaded content may be manually or automatically selected. Downloading may be handed off from one storage device to another storage device that has greater wireless signal strength. Downloading may be multicast from a network device to both the wireless device and the storage device.

34 Claims, 7 Drawing Sheets

700 A computer program product.

704 A signal bearing medium.

702 one or more instructions for determining if a wireless connection is within range; when the wireless connection is within range, making a network connection to the content storing device through at least the wireless connection; and downloading at least one content from the content storing device during an idle time and when the wireless mobile device has sufficient power; and/or one or more instructions for receiving a selection of at least one content to periodically download from the Internet; periodically downloading the content through a broadband access to the Internet; determining if the wireless mobile device has come within range of a wireless connection; when the wireless mobile device has come within range of a wireless connection, making a network connection to the wireless mobile device through at least the wireless connection; and uploading at least one content to the wireless mobile device during an idle time; and/or one or more instructions for downloading the streaming content through a broadband access to the Internet; determining if the content storing device is reachable by a wired or a first wireless connection and the wireless mobile device is reachable by a second wireless connection; when the content storing device is reachable by a wired or a first wireless connection and the wireless mobile device is reachable by a second wireless connection, making the wired or the first wireless connection to the content storing device and the second wireless connection to the wireless mobile device; and multicasting the streaming content to the content storing device and the wireless mobile device.

| 708 a computer-readable medium | 710 a recordable medium | 706 a communications medium |

FIG. 7

BROADBAND EXTENSION FOR CONTENT DELIVERY

BACKGROUND

Description of the Related Art

Unless otherwise indicated herein, the approaches described in this section are not prior art to the claims in this application and are not admitted to be prior art by inclusion in this section.

Mobile devices such as cell phones, smart phones, portable media players, personal digital assistants (PDA) and laptop computers can be used to play content downloaded from the Internet. Some mobile devices can connect to the Internet directly to download the content. However, Internet access on mobile devices can be slow. In addition, downloading content directly to mobile devices can be expensive if data transfer is billed by the byte and/or by the minute.

Alternatively, the content can be downloaded from the Internet by another device and then transferred to the mobile device. For example, the content can be downloaded from the Internet using a computer with broadband Internet access. Then, the content can be transferred from the computer to the mobile device through a portable medium such as a flash drive, or through a USB wire connection between the computer and the mobile device.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 7 is a block diagram illustrating a computer program product of the broadband extension, all arranged in accordance with at least some embodiments of the present disclosure.

DETAILED DESCRIPTION

Figure 1:
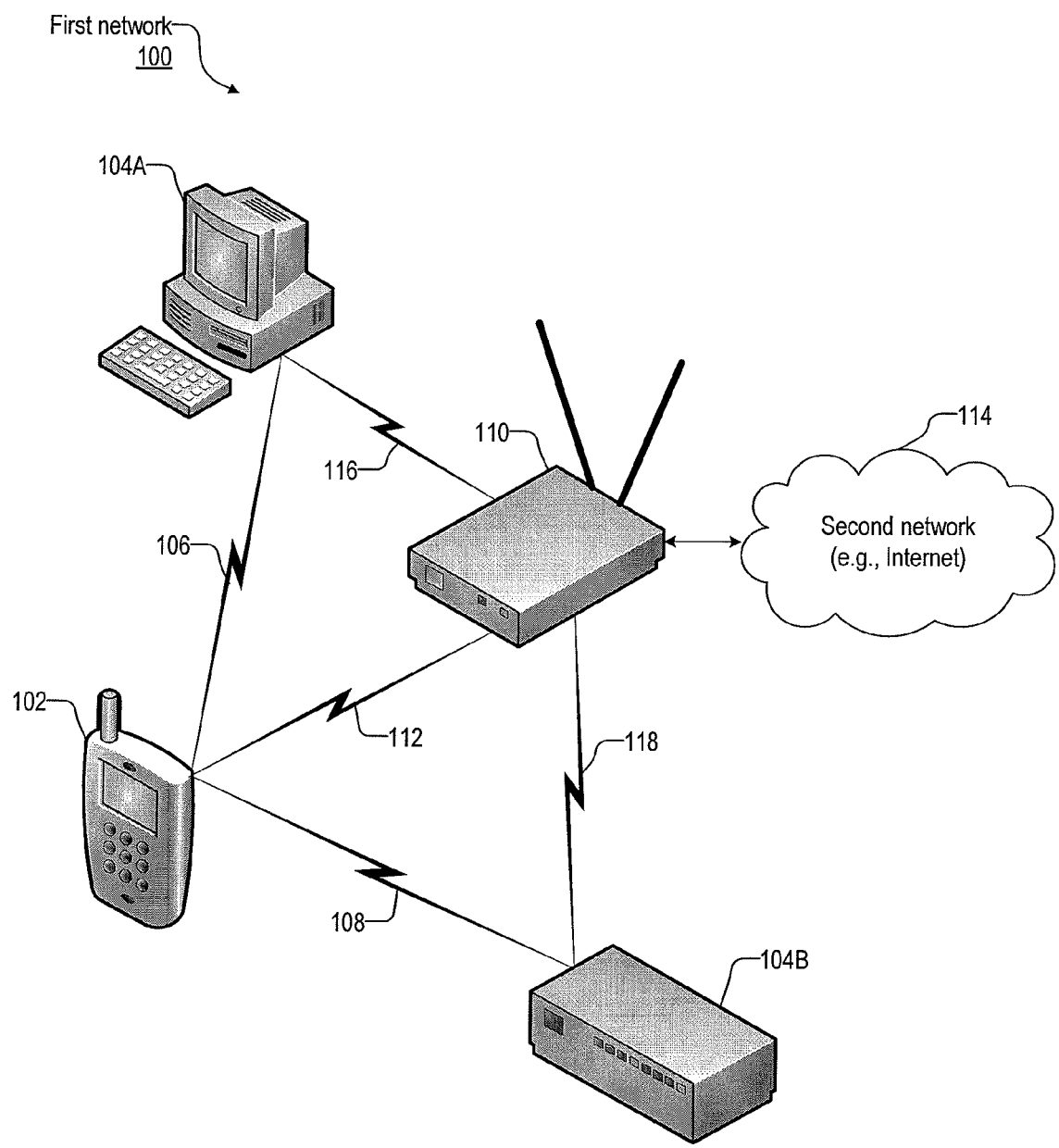
FIG. 1 illustrates a first network with access to a second network for implementing broadband extension.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, computer programs and systems related to extending broadband access for delivering content to wireless devices.

Some consumers enjoy the convenience of viewing content anytime anywhere on mobile devices. However, existing communication methods rely on low bandwidth and highly dynamic cellular or Wi-Fi environment outside of locations where the consumers have broadband access (e.g., at home or at work), and do not fully utilize the opportunity of transmission between devices in locations with broadband access during idle periods such as nighttime. Thus, embodiments of the present disclosure extend broadband access for delivering content to wireless devices in locations with broadband access (hereafter "broadband extension").

In broadband extension, a storage device may be configured to automatically download and store contents (e.g., videos, music, and photos) using broadband access at a location. The storage device may automatically transmit contents to a wireless device whenever it comes in close proximity to a wireless network at this location. Prior to transmission, the storage device may reformat contents so they are suitable for the wireless device, which may have limited memory and limited processing power. The transmission of contents may occur when the storage device and the wireless device are idle, the wireless device has sufficient power, or both. The transmission of contents may occur in a preset sequential order (e.g., transmit a particular content before another) and the result of the transmission may be displayed.

Broadband extension may be implemented using two or three types of devices. Type A wireless devices include, but are not limited to, cellular telephones, smart phones, laptop computers, personal digital assistants (PDAs), and portable media players with wireless connectivity. Type B storage devices include, but are not limited to, general purpose computers, network storage devices, and set-top boxes with facility for network communications. Type C network devices include, but are not limited to, network gateway devices, network routers, network switches, network wireless access points, computer systems or servers configured to operate as network gateways/routers/switches, and modems.

FIG. 1 illustrates a first network 100 (e.g., a local area network) with broadband access to a second network 114 (e.g., a wide area network such as the Internet) for implementing broadband extension in accordance with at least some embodiments of the present disclosure. First network 100 may be at any location, such as a home, an office, a multi-tenant building, or a factory floor. When a type A wireless device 102 (e.g., a mobile phone) is within wireless range to a first type B storage device 104A (e.g., a computer), the type A wireless device 102 may establish a wireless communication link 106 with the first type B storage device 104A. Similarly when the type A wireless device 102 is within wireless range to a second type B storage device 104B (e.g., a set-top box), the type A wireless device 102 may establish a wireless communication link 108 with the second type B storage device 104B. When the type A wireless device 102 is within wireless range to a type C network device 110 (e.g., a network gateway), the type A wireless device 102 may establish a wireless communication link 112 with the type C network device 110. The wireless protocol may be Wi-Fi (Wireless Fidelity type of wireless local area network or WLAN), WiMAX (Worldwide Interoperability for Microwave Access), Bluetooth, or another similar wireless protocol.

The type C network device 110 may have a broadband communicating link to second network 114. Type B storage device 104A, 104B may establish a wired or wireless communication link 116, 118 with the type C network device 110. Type B storage device 104A, 104B may receive broadband access to second network 114 through the communication link 116, 118 through the type C network device 110. In addition, type B storage device 104A, 104B may establish an indirect communication link with the type A wireless device 102 through the type C network device 110.

Figure 2:
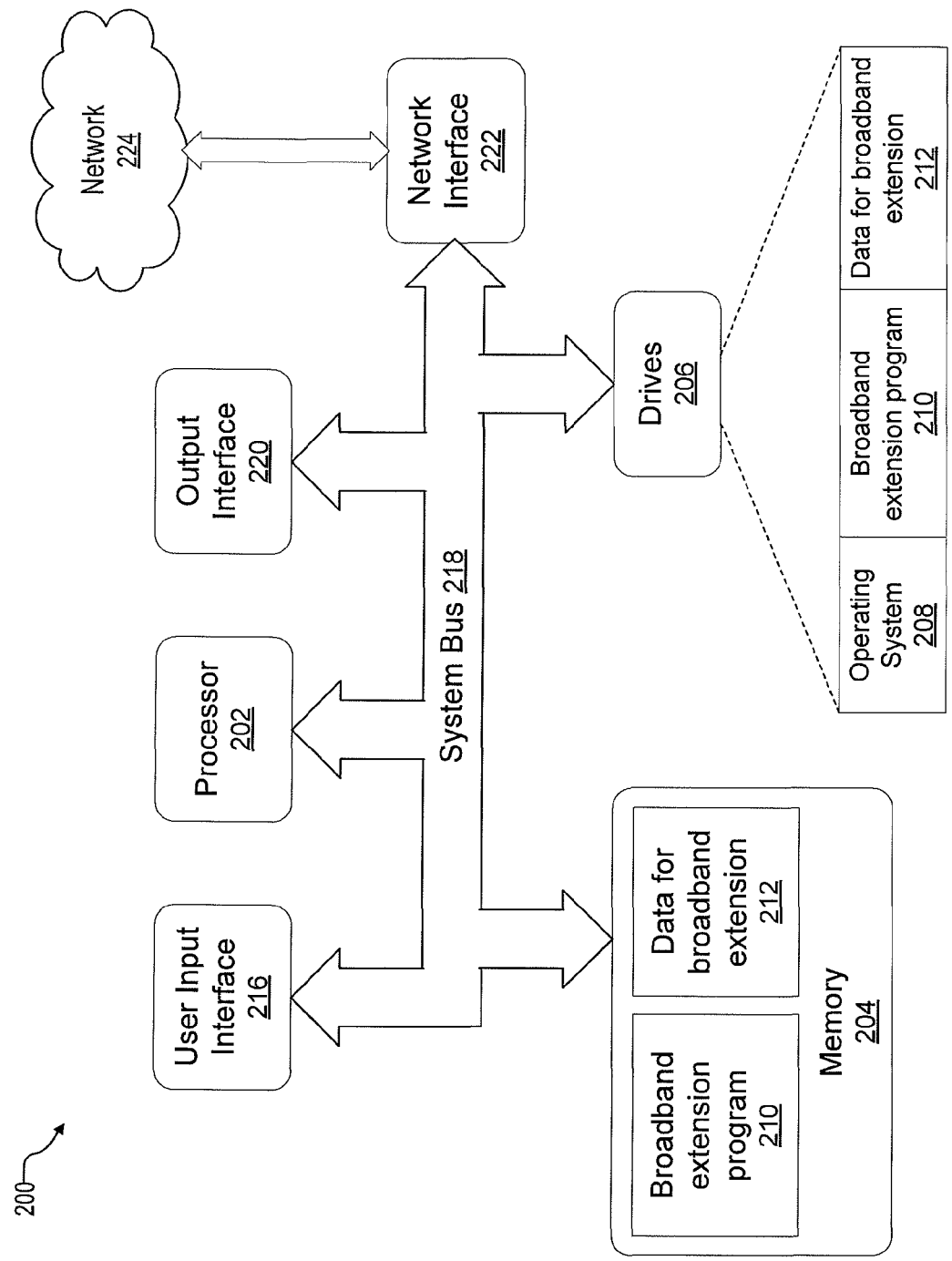
FIG. 2 depicts an example type A wireless device or an example type B storage device for implementing embodiments of broadband extension.

With reference to FIG. 2, depicted is an example type A wireless device or an example type B storage device (hereafter "broadband extension device" 200) for implementing embodiments of broadband extension. Broadband extension device 200 may include one or more of a processor 202, a memory 204, and one or more storage devices 206. The storage devices 206 may provide storage of one or more of an operating system 208, a broadband extension program 210, and data 212 for the broadband extension program. Processor 202 may load program 210 into memory 204, execute program 210 to modify data 212, and save data 212 in storage devices 206.

Broadband extension device 200 may further include a use input interface 216 through which commands and data may be entered. Input devices may be coupled to the user input interface 216 and may include one or more of an electronic digitizer, a microphone, a keyboard and a pointing device, commonly referred to as a mouse, trackball or touch pad. Other input devices may include a joystick, game pad, satellite dish, scanner, or the like.

These and other input devices may be coupled to processor 202 through the input interface 216, which is also coupled to a system bus 218 or any other appropriate interface or bus structures. Example interfaces includes a parallel port, a game port or a universal serial bus (USB). Broadband extension device 200 may also include other peripheral output devices such as speakers and video displays which may be coupled to the device 200 through an output interface 220 or the like.

Broadband extension device 200 may operate in a networked environment using logical connections to one or more computers, such as a remote computer coupled to a network interface 222. The remote computer may be another broadband extension device, a personal computer, a server, a router, a network PC, a mobile phone, a peer device, or other common network node, and may include many or all of the elements described above relative to broadband extension device 200.

Networking environments are commonplace in offices, enterprise-wide area networks (WAN), local area networks (LAN), intranets and the Internet. For example, in the subject matter of the present application, broadband extension device 200 may comprise the source machine from which data is being migrated, and the remote computer may comprise the destination machine or vice versa. Note however, that source and destination machines need not be connected by a network 224 or any other means, but instead, data may be migrated via any media capable of being written by the source platform and read by the destination platform or platforms. When used in a LAN or wireless LAN networking environment, broadband extension device 200 is coupled to the LAN through network interface 222 or an adapter. When used in a WAN networking environment, broadband extension device 200 may include a modem or other means for establishing communications over the WAN, such as the Internet or network 224. It will be appreciated that other means of establishing a communications link between the computers may be used.

According to one embodiment, broadband extension device 200 is coupled to a wireless networking environment such that the processor 202 and/or program 210 can perform broadband extension in accordance with embodiments described herein.

Figure 3:
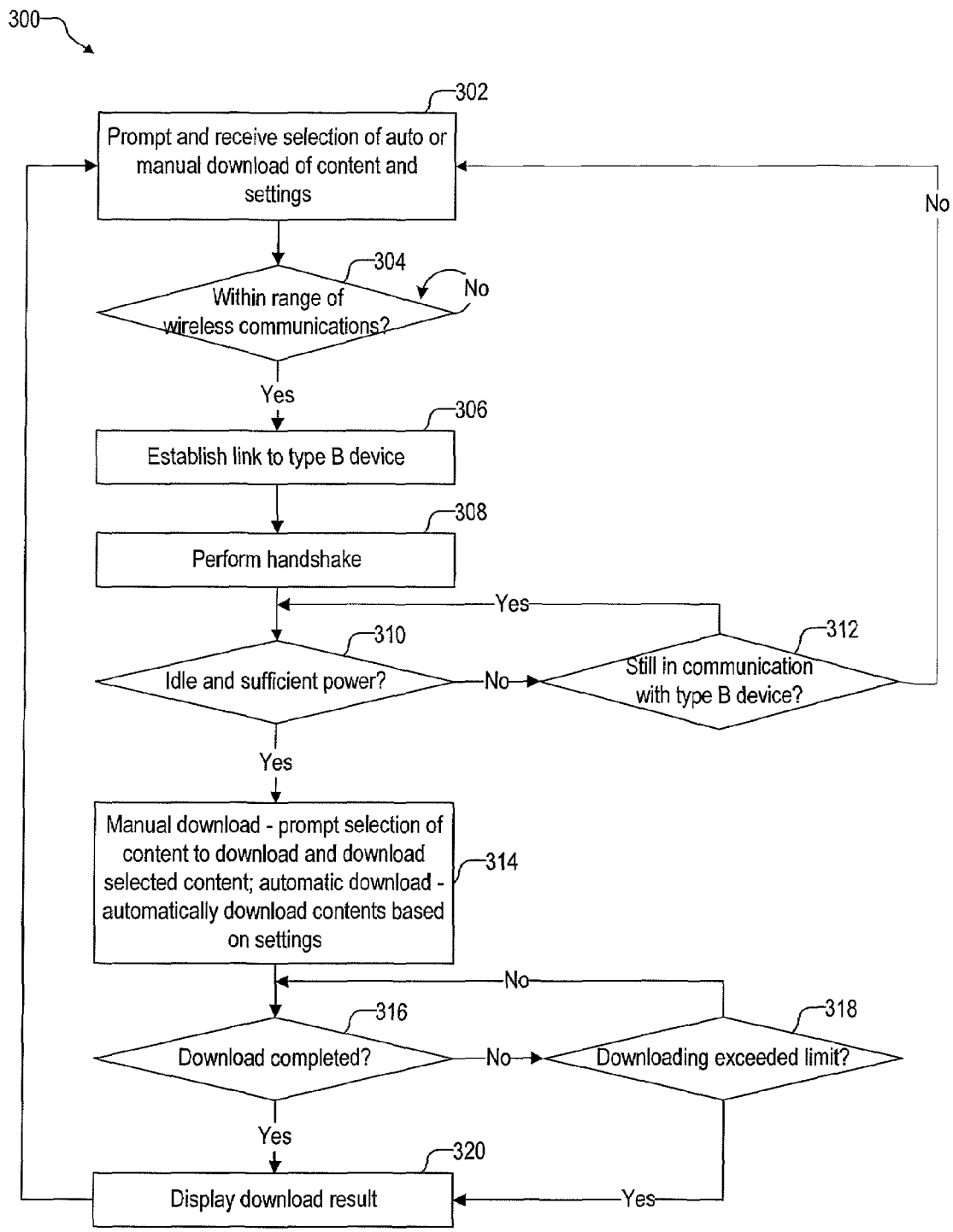
FIG. 3 is a flowchart of a method for a type A wireless device to download one or more contents from a type B storage device.

FIG. 3 is a flowchart of a method 300 for a type A wireless device (e.g., type A device 102 in FIG. 1) to download one or more contents from a type B storage device (e.g., type B device 104A in FIG. 1) in accordance with at least some embodiments of the present disclosure. Processing begins at operation 302, where the type A wireless device may prompt for a selection of automatic or manual downloading of the contents. If automatic download is selected, the type A wireless device may prompt for a selection of one or more specific contents to be periodically downloaded from a second network (e.g., second network 114 in FIG. 1) and the sequential order in which the contents are to be downloaded (e.g., a particular video before another). The contents that may be periodically downloaded from the second network are based on a list provided by the type B storage device during a handshake operation 308 (described later) in a previous pass through method 300. Alternatively the type B storage device may directly prompt for these settings from the user. Operation 302 may be followed by operation 304.

In operation 304, the type A wireless device may determine if it is within range for wireless communications. Operation 304 may be repeated until the type A wireless device is within range for wireless communications. When the type A wireless device is within range for wireless communications, operation 304 may be followed by operation 306. For example, the type A wireless device may be within range for wireless communications when the type A wireless device travels to a location with a first network (e.g., first network 100 in FIG. 1) having broadband access to a second network (e.g., second network 114 in FIG. 1).

In operation 306, the type A wireless device may establish a communication link to the type B storage device. The communication link to the type B storage device may be a direct wireless communication link to the type B storage device (e.g., in an ad hoc mode) or an indirect communication link such as a wireless communication link through a type C network device, which may have either a wired or wireless communication link to the type B storage device (e.g., in an infrastructure mode). Operation 306 may be followed by operation 308.

In operation 308, the type A wireless device may perform a handshake with the type B storage device to confirm that both devices are configured for broadband extension and the downloading mode (manual or automatic). In the handshake, the type A wireless device may transmit to the type B storage device the list of contents to be periodically downloaded and the sequential order in which the contents are to be downloaded. The type A wireless device may also receives a list of contents that the type B storage device can download from the second network. Operation 308 may be followed by operation 310.

In operation 310, the type A wireless device may determine whether two conditions are met: 1) idle time is occurring, and 2) the type A wireless device has sufficient power. Idle time can be defined as when at least one of the type A wireless device and the type B storage device is not being used for other demanding purposes so the device has sufficient resources (e.g., meeting threshold usage percentages for processing power and memory) to carry out wireless communications, processing, and storage of content without producing noticeable lag in the performance of the device. Alternatively, idle time can be defined as a specific time period (e.g., a predetermined time of the day) when at least one of the type A wireless device and the type B storage device is not likely to be used for other demanding purposes and there is little wireless interference from other devices in the vicinity. The type A wireless device has sufficient power when it can download at least one content before its runs out of power. When both conditions are met, operation 310 may be followed by operation 314. Otherwise, when either condition fails to be met, operation 310 may be followed by operation 312.

In operation 312, the type A wireless device may determine whether it is still in communication with the type B storage device (i.e., logically connected via a communication link). If the type A wireless device is still in communication with the type B storage device, then operation 312 may be followed by operation 310. In some examples, the type A wireless device may repeat operation 310 until both conditions in operation 310 are met or until the type A wireless device is no longer in communication with the type B storage device. In some other examples, the type A wireless device may terminate after attempting to establish communications for a predetermined time interval or after a predetermined number of attempts (not shown). If the type A wireless device is no longer in communication with the type B storage device, then operation 312 may be followed by operation 302 so that method 300 may be repeated.

In operation 314, if manual download was selected in operation 302, at least one of the type A wireless device and the type B storage device may prompt at its respective display for a selection of a specific content to be downloaded from the list of contents that the type B storage device can download from the second network. Alternatively, if automatic download was selected in operation 302, the type A wireless device may automatically download content from the type B storage device. If the type A wireless device is automatically downloading multiple contents, the sequential order for downloading the contents may be based on the sequential order set in operation 302, or in some examples by a default sequential ordering based on some other criteria (e.g., availability of content for downloading from a cache). Operation 314 may be followed by operation 316.

In operation 316, the type A wireless device may determine whether a download has completed. If the download has not completed, operation 316 may be followed by operation 318. If the download has completed, operation 316 may be followed by operation 320.

In operation 318, the type A wireless device may determine whether the downloading has exceeded a total download size limit. If the downloading has not exceeded the total download size limit, operation 318 may be followed by operation 316. The type A wireless device may continue to download content until either the download has completed or the downloading has exceeded the total download size limit. If the downloading has exceeded the total download size limit, the type A wireless device may stop the downloading and operation 318 may be followed by operation 320. In some examples, a download timeout (not shown) may be used to terminate a potential infinite loop for operations 316 and 318 where a download may fail to complete within some predetermined time limit.

In operation 320, the type A wireless device may display the download result (e.g., a list of the successfully downloaded contents). Operation 320 may be followed by operation 302 so that method 300 may be repeated. If manual download was selected in operation 302 and the total download size has not been exceeded, operation 320 may be followed by operation 310 and the operations described above may be repeated to select another content to download.

Figure 4:
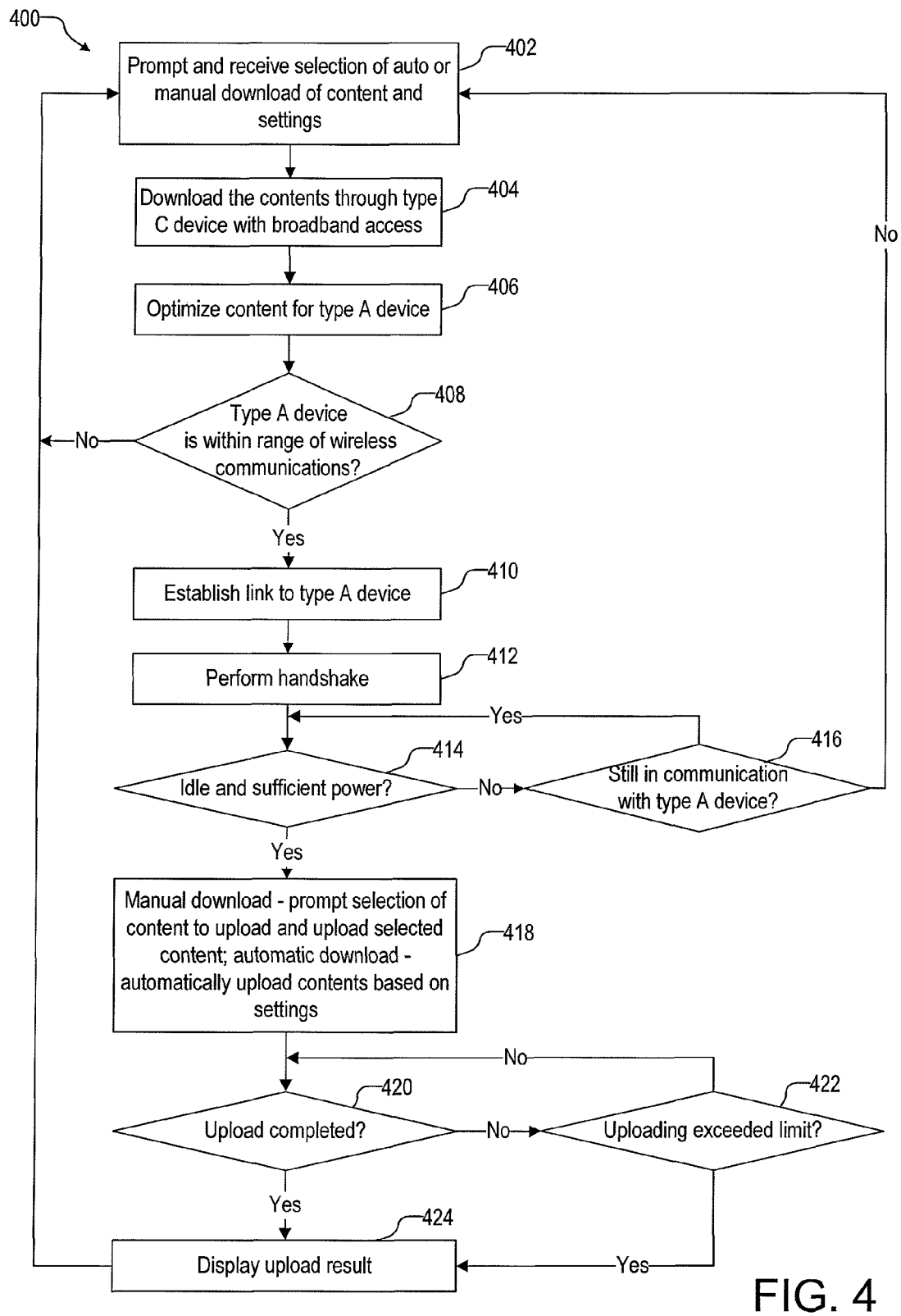
FIG. 4 is a flowchart of a method for a type B storage device to upload one or more contents to a type A wireless device.

FIG. 4 is a flowchart of a method 400 for a type B storage device (e.g., type B device 104A in FIG. 1) to upload one or more contents to a type A wireless device (e.g., type A device 102 in FIG. 1) in accordance with at least some embodiments of the present disclosure. Processing begins at operation 402, where the type B storage device may prompt for a selection of automatic or manual downloading of the contents. If automatic download is selected, the type B storage device may prompt for a selection of one or more specific contents to be periodically downloaded from a second network (e.g., second network 114 in FIG. 1) and the sequential order in which the contents are to be downloaded (e.g., a particular video before another). Alternatively the type A wireless device may directly prompt for these settings from the user and send a list of contents for periodic downloading in a handshake with the type B storage device described later in operation 410. Operation 402 may be followed by operation 404.

In operation 404, the type B storage device may periodically download the specified contents through a broadband access to the second network. Broadband access for the type B storage device may be obtained through a type C network device with broadband access to the second network. Operation 404 may be followed by operation 406.

In operation 406, the type B storage device may optimize the contents downloaded from the second network by converting the content to a suitable format for the type A wireless device before uploading the content to the type A wireless device. Operation 406 may be followed by operation 408.

In operation 408, the type B storage device may determine whether a type A wireless device may be within range for wireless communications. For example, a type A wireless device may be within range for wireless communications when the type A wireless device travels to a location with a first network (e.g., first network 100 in FIG. 1) having broadband access to the second network. If a type A device is not within range for wireless communications, operation 408 may be followed by operation 402 so that method 400 may be repeated. When a type A wireless device is within range for communications, operation 408 may be followed by operation 410.

In operation 410, the type B storage device may establish a communication link to the type A wireless device. The communication link to the type A wireless device may be a direct wireless communication link to the type A wireless device. Alternatively, the communication link to the type A wireless device may be an indirect communication link such as a wired or wireless communication link to a type C network device, which has a wireless communication link to the type A wireless device. Operation 410 may be followed by operation 412.

In operation 412, the type B storage device may perform a handshake with the type A wireless device to confirm that both devices are configured for broadband extension and the uploading mode (manual or automatic). In the handshake, the type B storage device may receive from the type A wireless device a list of one or more specific contents to periodically download from the second network, and any sequential order in which the contents are to be downloaded. The type B storage device may also transmit a list of contents that the type B storage device can download from the second network. Operation 412 may be followed by operation 41.

In operation 414, the type B storage device may determine whether two conditions are met: 1) idle time is occurring, and 2) the type A wireless device has sufficient power. In some examples, idle time may be defined as a time where at least one of the type A wireless device and the type B storage device is not being used for other demanding purposes so the device has sufficient resources (e.g., meeting threshold usage percentages for processing power and memory) to carry out wireless communications, processing, and storage of content without noticeable lag in the performance of the device. In some other examples, idle time may be defined as a specific time period (e.g., when it is night time) when at least one of the type A wireless device and the type B storage device is not likely to be used for other demanding purposes and there may be little wireless interference from other devices in the vicinity. When both conditions are met, operation 414 may be followed by operation 418. Otherwise, when either condition fails to be met, operation 414 may be followed by operation 416.

In operation 416, the type B storage device may determine whether the type B storage device is still in communication with the type A wireless device. If the type B storage device is still in communication with the type A wireless device, operation 416 may be followed by operation 414. In some examples, the type B wireless device may repeat operation 414 until both conditions in operation 414 are met or until the type B wireless device is no longer in communication with the type A wireless device. In some other examples, the type B wireless device may terminate after attempting to establish communications for a predetermined time interval or after a predetermined number of attempts (not shown). If the type B storage device is no longer in communication with the type A wireless device, operation 416 may be followed by operation 402 so that method 400 may be repeated.

In operation 418, if manual download was selected in operation 402 (or 302), at least one of the type B storage device and the type A wireless device may prompt at its respective display for a selection of a specific content to be downloaded from the list of contents that the type B storage device can download from the second network. The type B storage device may then upload the content to the type A wireless device.

Alternatively, if automatic download was selected in operation 402 (or 302), the type B storage device may automatically upload content to the type A wireless device. If the type B storage device is automatically uploading multiple contents, the sequential order for uploading the contents may be based on the sequential order set in operation 402 (or 302), or in some examples by a default sequential ordering based on some other criteria (e.g., availability of content for uploading from a cache). Operation 418 may be followed by operation 420.

In operation 420, the type B storage device may determine whether an upload has completed. If the upload has not completed, operation 420 may be followed by operation 422. If the upload has completed, operation 420 may be followed by operation 424.

In operation 422, the type B storage device may determine whether the uploading has exceeded a total download size limit for the type A wireless device. If the uploading has not exceeded the total download size limit, operation 422 may be followed by operation 420. The type B storage device may continue to upload content until either the upload has completed or the uploading has exceeded the total download size limit. If the uploading has exceeded the total download size limit, the type B storage device may stop the uploading and operation 422 may be followed by operation 424. In some examples, an upload timeout (not shown) may be used to terminate a potential infinite loop for operations 420 and 422 where an upload may fail to complete within some predetermined time limit.

In operation 424, the type B storage device may display the upload result (e.g., a list of the successfully uploaded contents). Operation 424 may be followed by operation 402 so method 400 may be repeated. If manual download was selected in operation 402 (or 302) and the total download size has not been exceeded, operation 424 may be followed by operation 414 and the operations described above may be repeated to select another content to upload.

Figure 5:
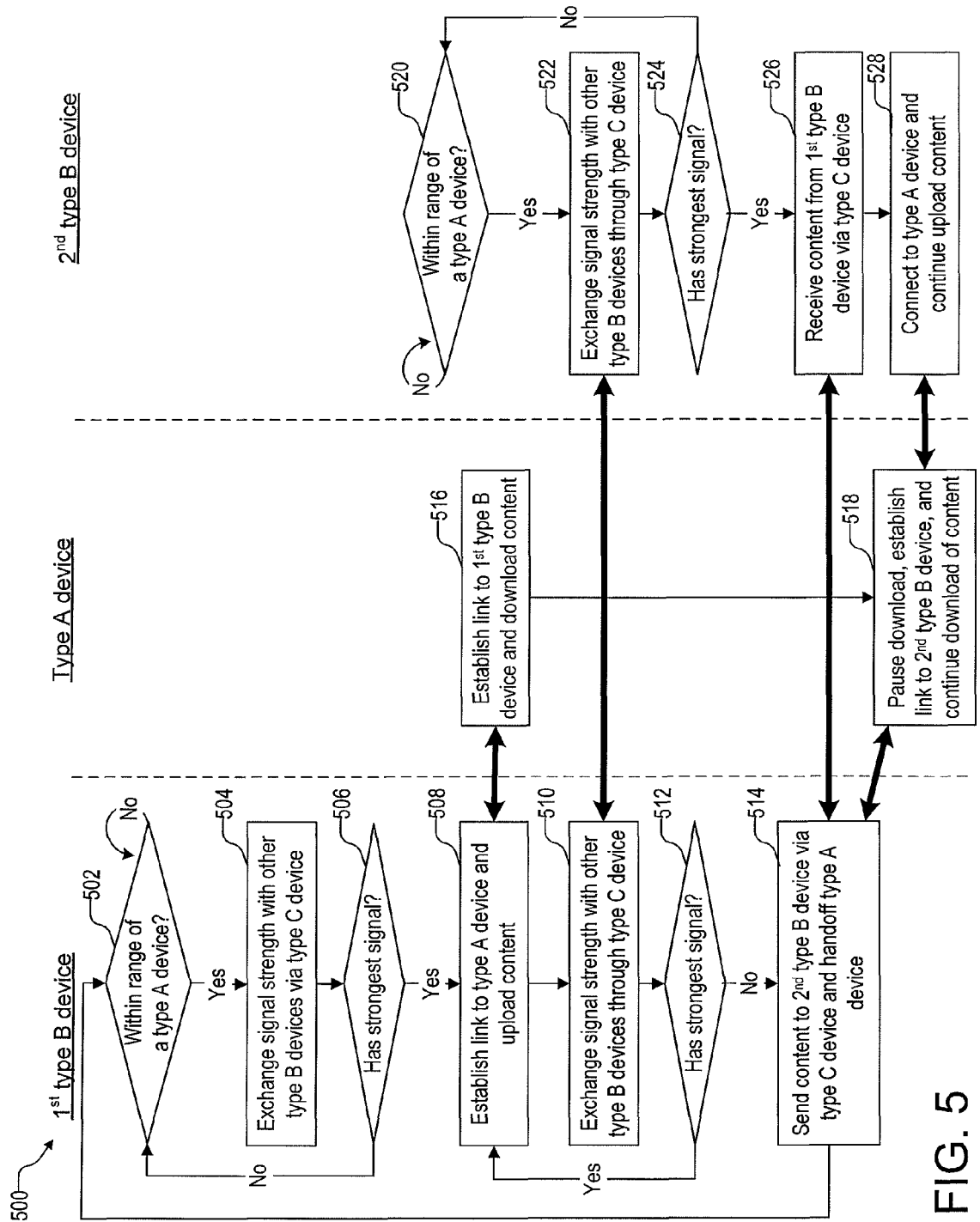
FIG. 5 is a flowchart of a method for handing off the uploading of content to a type A wireless device from one type B storage device to another type B storage device.

FIG. 5 is a flowchart of a method 500 for handing off the uploading of content to a type A wireless device from one type B storage device to another type B storage device in accordance with at least some embodiments of the present disclosure. The first column shows the operations that may be performed by a first type B storage device (e.g., type B device 104A in FIG. 1). The second column shows the operations that may be performed by a type A wireless device (e.g., type A device 102 in FIG. 1). The third column shows the operations that may be performed by a second type B storage device (e.g., type B device 104B in FIG. 1). Both the first and the second type B storage devices may establish a direct wireless communication link with the type A wireless device. The first type B storage device may have an indirect communication link with the second type B storage device through a type C network device. The communication link through the type C network device may be a wired or wireless communication link. In some alternative embodiments, the first type B storage device may have a direct communication link with the second type B storage device through either a wired or a wireless communication link.

Referring to the first column, in operation 502, the first type B storage device may determine whether a type A wireless device is within range for wireless communications with the first type B storage device. The first type B storage device may repeat this operation 502 until a type A wireless device is within range for wireless communications with the first type B storage device. When a type A wireless device is within range for wireless communications, operation 502 may be followed by operation 504.

Once a type A wireless device is within range for wireless communications with the first type B storage device, the first type B storage device may determine the signal strength for a wireless communication link between the first type B storage device and the type A wireless device (hereafter "first signal strength").

In operation 504, the first type B storage device may exchange signal strength information with other type B storage devices that are in communication with a network (e.g., network 100 in FIG. 1) via a type C network device. The first type B storage device may send the first signal strength to other type B storage devices on the network. The first type B storage device may also receive from other type B storage devices on the network the signal strengths for the wireless communication links between the other type B storage devices and the type A wireless device. Operation 504 may be followed by operation 506.

In operation 506, the first type B storage device may determine whether it has the strongest signal to the type A wireless device. If the first type B storage device does not have the strongest signal to the type A wireless device, then operation 506 may be followed by operation 502, where the first type B storage device may again attempt to establish wireless communications with a type A wireless device. If the first type B storage device does have the strongest signal strength to the type A wireless device, then operation 506 may be followed by operation 508.

In operation 508, the first type B storage device may establish a wireless communication link with the type A wireless device and upload content to the type A wireless device. For operation 508, the first type B storage device may execute method 400 described earlier. Operation 508 may be followed by operation 510.

In operation 510, the first type B storage device may exchange signal strength information with other type B storage devices through the type C network device. The first type B storage device may send its current signal strength to other type B storage devices on the network. The first type B storage device may also receive from other type B storage devices on the network the signal strengths of the wireless communication links between the other type B storage devices and the type A wireless device. Operation 510 may be followed by operation 512.

In operation 512, the first type B storage device may determine whether it still has the strongest signal to the type A wireless device. For example, the first type B storage device may determine whether the second signal strength from the second type B storage device is greater than the first signal strength. If the second signal strength is not greater than the first signal strength, then operation 512 may be followed by operation 508, where the first type B storage device may continue communicating with the type A wireless device and continues to upload content. If the second signal strength is greater than the first signal strength, then operation 512 may be followed by operation 514.

In operation 514, the first type B storage device may send content to be uploaded to the second type B storage device via the type C network device and hand off the uploading of content to the second type B storage device. The first type B storage device may also inform the type A wireless device of the hand off.

Referring to the second column, in operation 516, the type A wireless device may establish a wireless communication link with the first type B storage device and download content from the first type B storage device. Operation 516 is similar to operation 508 performed by the first type B storage device. For operation 516, the type A wireless device may execute method 300 described earlier. Operation 516 may be followed by operation 518.

In operation 518, the type A wireless device may pause downloading from the first type B storage device, establish a wireless communication link with the second type B storage device, and continues to download content from the second type B storage device.

Referring to the third column, in operation 520, the second type B storage device may determine whether a type A wireless device is within range for wireless communications with the second type B storage device. The second type B storage device may repeat this operation until a type A wireless device is within range for wireless communications with the second type B storage device. When a type A wireless device is within range, operation 520 may be followed by operation 522.

In operation 522, the second type B storage device may exchange signal strength information with other type B storage devices through the type C network device. The second type B storage device may send its current signal strength to other type B storage devices on the network. The second type B storage device may receive from other type B storage devices on the network the signal strengths of the wireless communication links between the other type B storage devices and the type A wireless device. Operation 522 is similar to operation 510 performed by the first type B storage device. Operation 522 may be followed by operation 524.

In operation 524, the second type B storage device determines whether the second type B storage device has the strongest signal to the type A wireless device. If the second type B storage device does not have the strongest signal to the type A wireless device, operation 524 may be followed by operation 520, where the second type B storage device goes back to determining whether a type A wireless device is within range. If the second type B storage device does have the strongest signal strength to the type A wireless device, operation 524 may be followed by operation 526.

In operation 526, the second type B storage device may receive the content to be uploaded from the first type B storage device via the type C network device. Operation 526 is similar to operation 514 performed by the first type B storage device. Operation 526 may be followed by operation 528.

In operation 528, the second type B storage device may establish a wireless communication link with the type A wireless device and continue to upload the content to the type A wireless device. Operation 528 is similar to operation 518 performed by the type A wireless device. Operation 528 may be followed by operations similar to operations 510 to 514 described for the first type B storage device to hand off the uploading of the content to another type B storage device.

Figure 6:
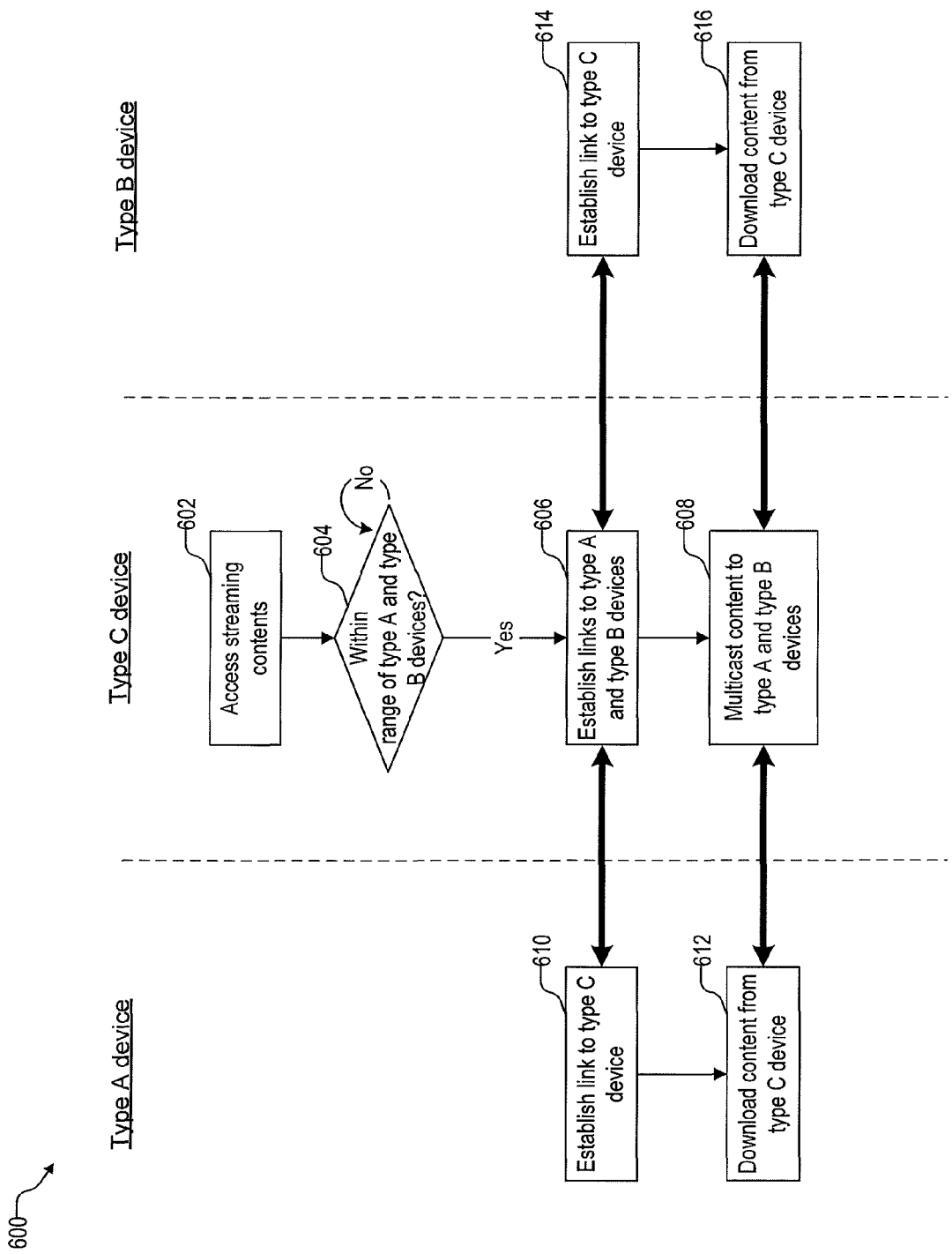
FIG. 6 is a flowchart of a method for multicasting a streaming content to a type B storage device and a type A wireless device.

FIG. 6 is a flowchart of a method 600 for multicasting a streaming content to a type B storage device and a type A wireless device in accordance with at least some embodiments of the present disclosure. The first column shows the operations performed by a type A wireless device (e.g., type A device 102 in FIG. 1). The second column shows the operations performed by a type C network device (e.g., type C device 110 in FIG. 1). And the third column shows the operations performed by a type B storage device (e.g., type B device 104A in FIG. 1). The type C network device may establish a wireless communication link with the type A wireless device. The type C network device may establish a wired or wireless communication link with the type B storage device.

Referring to the second column, in operation 602, the type C network device may download streaming contents through a broadband access to a network (e.g., network 114 in FIG. 1). Operation 602 may be followed by operation 604.

In operation 604, the type C network device may determine whether a type A wireless device and a type B storage device are within range for communications. The type C network device may determine whether a type A wireless device is within range for wireless communications. If the type B storage device is in communication with the type C network device by a wired link, then the type B storage device may be determined as within range. If the type B storage device is in communication with the type C network device by a wireless communication link, then the type C network device may determine that the type B storage device is within range for wireless communications. Operation 604 may be repeated until the type A wireless device and the type B storage device are within range for communications. When both devices are determined to be within range, then operation 604 may be followed by operation 606.

In operation 606, the type C network device may establish communication links with the type A wireless device and the type B storage device. Operation 606 may be followed by operation 608.

In operation 608, the type C network device may multicast the streaming content to the type A wireless device and the type B storage device.

Referring to the first column, in operation 610, the type A wireless device may establish a wireless communication link with the type C network device. Operation 610 is similar to operation 606 performed by the type C network device. Operation 610 may be followed by operation 612.

In operation 612, the type A wireless device may download the content from the type C network device. Operation 612 is similar to operation 608 performed by the type C network device.

Referring to the third column, in operation 614, the type B storage device may establish communication link, wired or wireless, with the type C network device. Operation 614 is similar to operation 606 performed by the type C network device. Operation 614 may be followed by operation 616.

In operation 616, the type B storage device may download the content from the type C network device. Operation 616 is similar to operation 608 performed by the type C network device.

FIG. 7 is a block diagram illustrating a computer program product 700 of the broadband extension in accordance with at least some embodiments of the present disclosure. Computer program product 700 includes one or more sets of instructions 702 for executing the methods of the broadband extension. Computer program product 700 may be transmitted in a signal bearing medium 704 or another similar communication medium 706. Computer program product 700 may be recorded in a computer readable medium 708 or another similar recordable medium 710.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. For example, the type B storage device may itself be a network device so that it has a broadband access to network 114. Thus, such a type B storage device may directly access network 114 without the assistance of a type C network device. The various aspects and embodiments disclosed herein are for purposes of illustration and are not intended to be limiting, with the true scope and spirit being indicated by the following claims.

I claim:

1. A method for a wireless device to download at least one content from a storage device, comprising:
   determining that the wireless device is within a range for wireless communications;
   in response to determination that the wireless device is within the range for wireless communications, establishing a communication link to the storage device through at least a wireless communication link;
   determining that the wireless device is available to download the at least one content based on:
      the wireless device is idle;
      the wireless device has sufficient power to download the at least one content; and
      the communication link is established; and
   initiating a download of the at least one content from the storage device in response to determination that the wireless device is available to download the at least one content,
   wherein the download is able to be terminated by the wireless device prior to completion of the download, in response to either or both:
      determination by the wireless device that the download has exceeded a specific download size limit; and
      failure of the download to complete within a specific time limit.

2. The method of claim 1, further comprising:
   receiving a list of contents from the storage device over the communication link prior to initiating the download;
   receiving a selection of the at least one content from the list of contents; and
   sending the selection of the at least one content to the storage device.

3. The method of claim 1, further comprising:
   receiving a sequential order to download multiple contents including the at least one content, wherein initiating the download comprises initiating the download of the multiple contents from the storage device in the sequential order.

4. The method of claim 1, further comprising:
   terminating the download and displaying a list of downloaded contents.

5. The method of claim 1, wherein the wireless device is idle if the wireless device has resources to download the at least one content without producing noticeable lag, or during a time period in a day.

6. The method of claim 1, wherein establishing the communication link to the storage device comprises one of establishing a direct wireless communication link to the storage device, or establishing an indirect communication link with the storage device via a wireless access point, wherein the wireless access point is arranged in communication with the storage device via either a wired communication link or another wireless communication link.

7. A non-transitory computer-readable storage medium encoded with computer-executable instructions for a wireless device to download at least one content from a storage device, the instructions comprising:
   determining that the wireless device is within a range for wireless communications;
   in response to determination that the wireless device is within the range for wireless communications, establishing a communication link to the storage device through at least a wireless communication link;

terminating attempts to establish the communication link in response to failure to establish the communication link within a specific time interval or after a specific number of attempts;

determining that the wireless device is available to download the at least one content based on:
  the wireless device is idle;
  the wireless device has sufficient power to download the at least one content; and
  the communication link is established; and
initiating a download of the at least one content from the storage device in response to determination that the wireless device is available to download the at least one content.

8. The medium of claim 7, wherein the instructions further comprise:
  determining that a list of contents from the storage device has been received over the communication link prior to initiating the download;
  determining that a selection of the at least one content from the list of contents has been received; and
  sending the selection of the at least one content to the storage device.

9. The medium of claim 7, wherein the instructions further comprise:
  determining that a sequential order to download multiple contents including the at least one content has been received, wherein initiating the download comprises initiating the download of the multiple contents from the storage device in the sequential order.

10. The medium of claim 7, wherein the instructions further comprise:
  terminating the download and displaying a list of downloaded contents.

11. The medium of claim 7, wherein the wireless device is idle if the wireless device has resources to download the at least one content without producing noticeable lag, or during a time period in a day.

12. The medium of claim 7, wherein establishing the communication link to the storage device comprises one of establishing a direct wireless communication link to the storage device, or establishing an indirect communication link with the storage device via a wireless access point, wherein the wireless access point is arranged in communication with the storage device via either a wired communication link or another wireless communication link.

13. A method for a first storage device to upload at least one content to a wireless device, the first storage device being in a local area network that has a broadband communication link to a wide area network, the method comprising:
  receiving, by the first storage device, a selection of the at least one content to periodically initiate a download of the at least one content;
  periodically initiating, by the first storage device, the download of the at least one content from the wide area network, via the broadband communication link, to the storage device in the local area network;
  determining, by the first storage device, if the wireless device has come within range for wireless communications;
  in response to determination that the wireless device is within range for wireless communications, establishing by the first storage device a communication link to the wireless device through at least a first wireless communication link;
  determining, by the first storage device, whether an idle time is occurring;
  in response to determination that the idle time is occurring, initiating by the first storage device an upload of the at least one content to the wireless device through the first wireless communication link;
  sending, by the first storage device, a first signal strength of the first wireless communication link between the first storage device and the wireless device to a second storage device;
  receiving, by the first storage device, a second signal strength of a second wireless communication link between the second storage device and the wireless device;
  determining, by the first storage device, whether the second signal strength is greater than the first signal strength; and
  in response to determination that the second signal strength is greater than the first signal strength:
    sending, by the first storage device, the content being uploaded to the second storage device; and
    handing off, by the first storage device, the upload to the second storage device, wherein the second storage device initiates the upload of the at least one content to the wireless device through the second wireless communication link.

14. The method of claim 13, further comprising:
  providing, by the first storage device, a list of contents to the wireless device over the communication link prior to uploading; and
  receiving, by the first storage device, a selection of the at least one content from the list of contents.

15. The method of claim 13, further comprising receiving, by the first storage device, a sequential order to download multiple contents including the at least one content, wherein initiating the download comprises initiating the download of the multiple contents from the storage device in the sequential order.

16. The method of claim 13, further comprising converting, by the first storage device, the at least one content to a suitable format for the wireless device prior to initiating the upload of the at least one content to the wireless device.

17. The method of claim 13, further comprising displaying, by the first storage device, a list of uploaded contents after completion of the upload.

18. The method of claim 13, wherein the idle time comprises either a time that at least one of the first storage device and the wireless device has sufficient resources to communicate the at least one content without producing noticeable lag, or a time period in a day.

19. The method of claim 13, wherein establishing the communication link to the wireless device comprises either establishing, by the first storage device, an indirect communication link through a wireless access point that is communicatively coupled to the wireless device, or establishing, by the first storage device a direct wireless communication link to the wireless device.

20. A non-transitory computer-readable storage medium encoded with computer-executable instructions for a storage device to upload at least one content to a wireless device, the storage device being in a local area network with a broadband communication link to a wide area network, the instructions comprising:
  determining, by the storage device, that a selection, of the at least one content to periodically initiate a download of the at least one content, has been received;

initiating, by the storage device, the download of the at least one content from the wide area network, via the broadband communication link, to the storage device in the local area network;

determining, by the storage device, if the wireless device has come within range for wireless communications;

in response to determination that the wireless device is within range for wireless communications, establishing by the storage device a communication link to the wireless device through at least a first wireless communication link;

determining, by the storage device, whether an idle time is occurring;

in response to determination that the idle time is occurring, initiating by the storage device an upload of the at least one content to the wireless device through the first wireless communication link;

determining, by the storage device, a first signal strength of the first wireless communication link between the storage device and the wireless device;

determining, by the storage device, whether a second signal strength, of a second wireless communication link between some other device and the wireless device, is greater than the first signal strength;

in response to determination the second signal strength is greater than the first signal strength:
sending, by the storage device, the content being uploaded to the other device; and
handing off, by the storage device, the upload to the other device, wherein the other device initiates the upload of the at least one content to the wireless device through the second wireless communication link.

21. The medium of claim 20, wherein the instructions further comprise:
providing, by the storage device, a list of contents to the wireless device over the communication link prior to uploading; and
determining, by the storage device, that a selection of the at least one content from the list of contents has been received.

22. The medium of claim 20, wherein the instructions further comprise determining, by the storage device, that a sequential order to download multiple contents including the at least one content has been received, wherein initiating the download comprises initiating the download of the multiple contents from the storage device in the sequential order.

23. The medium of claim 20, wherein the instructions further comprise converting, by the storage device, the at least one content to a suitable format for the wireless device prior to initiating the upload of the at least one content to the wireless device.

24. The medium of claim 20, wherein the instructions further comprise displaying, by the storage device, a list of uploaded contents after completion of the upload.

25. The medium of claim 20, wherein the idle time comprises either a time that at least one of the storage device and the wireless device has sufficient resources to communicate the at least one content without producing noticeable lag, or a time period in a day.

26. The medium of claim 20, wherein establishing the communication link to the wireless device comprises either establishing, by the storage device, an indirect communication link through a wireless access point that is communicatively coupled to the wireless device, or establishing, by the storage device, a direct wireless communication link to the wireless device.

27. A method for a network device to upload a streaming content to a storage device and a wireless device using a broadband communication link, comprising:
downloading the streaming content through the broadband communication link;
determining whether the storage device and the wireless device are concurrently reachable, the storage device being reachable by either a wired communication link or a first wireless communication link, the wireless device being reachable by a second wireless communication link;
in response to determination that the storage device and the wireless device are concurrently reachable, concurrently establishing the wired communication link or the first wireless communication link to the storage device and the second wireless communication link to the wireless device; and
multicasting the streaming content to the storage device over the wired communication link or the first wireless communication link and to the wireless device over the second wireless communication link.

28. A non-transitory computer-readable storage medium encoded with computer-executable instructions for a network device to upload a streaming content to a storage device and a wireless device using a broadband communication link, the instructions comprising:
downloading the streaming content through the broadband communication link;
determining if the storage device and the wireless device are concurrently within communication range, the storage device being reachable within the communication range by either a wired communication link or a first wireless communication link, the wireless device being reachable within the communication range by a second wireless communication link;
in response to determination that the storage device and the wireless device are concurrently within the communication range, concurrently establishing the wired communication link or the first wireless communication link to the storage device and the second wireless communication link to the wireless device; and
multicasting the streaming content to the storage device over the wired communication link or the first wireless communication link and to the wireless device over the second wireless communication link.

29. A computing device configured to download at least one content from a storage device, comprising:
a memory; and
a processor, wherein the processor is configured to:
determine that the computing device is within a range for wireless communications,
when the computing device is determined to be within the range for wireless communications, establish a communication link to the storage device through at least a wireless communication link,
determine that the computing device is available to download the at least one content based on:
both the computing device and the storage device are idle;
the computing device has sufficient power to download the at least one content; and
the communication link is established; and
initiate a download of the at least one content from the storage device in response to determination that the computing device is available to download the at least one content.

30. The method of claim 1, further comprising performing a handshake with the storage device to transmit a first list of contents to be periodically downloaded by the storage device and to receive a second list of contents that the storage device can download for the wireless device.

31. The medium of claim 7, wherein the instructions further comprise performing a handshake with the storage device to transmit a first list of contents to be periodically downloaded by the storage device and to receive a second list of contents that the storage device can download for the wireless device.

32. The method of claim 13, further comprising performing a handshake with the wireless device to receive a first list of contents to be periodically downloaded by the storage device and to transmit a second list of contents that the storage device can download for the wireless device.

33. The medium of claim 20, wherein the instructions further comprise performing a handshake with the wireless device to receive a first list of contents to be periodically downloaded by the storage device and to transmit a second list of contents that the storage device can download for the wireless device.

34. The computing device of claim 29, wherein the processor is further configured to perform a handshake with the storage device to transmit a first list of contents to be periodically downloaded by the storage device and to receive a second list of contents that the storage device can download for the computing device.

* * * * *

UNITED STATES PATENT AND TRADEMARK OFFICE
CERTIFICATE OF CORRECTION

PATENT NO. : 8,914,531 B2  
APPLICATION NO. : 12/416156  
DATED : December 16, 2014  
INVENTOR(S) : Chiang Page 1 of 1

It is certified that error appears in the above-identified patent and that said Letters Patent is hereby corrected as shown below:

In the Specification

In Column 12, Line 5, delete "and or" and insert -- and/or --, therefor.

In the Claims

In Column 16, Line 57, in Claim 19, delete "device" and insert -- device, --, therefor.

Signed and Sealed this
Ninth Day of June, 2015

Michelle K. Lee
*Director of the United States Patent and Trademark Office*